United States Patent [19]
Schmid

[11] Patent Number: 5,349,888
[45] Date of Patent: Sep. 27, 1994

[54] METHOD FOR MACHINING SURFACES OR REVOLUTION AT WORKPIECES AND DISK-SHAPED TOOL FOR PERFORMING SAME

[75] Inventor: Karlheinz Schmid, Nürtingen, Fed. Rep. of Germany

[73] Assignee: Gebr. Heller Maschinenfabrik Gesellschaft mit beschränkter Haftung, Nürtingen, Fed. Rep. of Germany

[21] Appl. No.: 896,836

[22] Filed: Jun. 11, 1992

[30] Foreign Application Priority Data

Jun. 11, 1991 [DE] Fed. Rep. of Germany ....... 4119162

[51] Int. Cl.$^5$ .............................................. B23B 5/00
[52] U.S. Cl. ......................................... 82/1.11; 82/106; 407/113
[58] Field of Search ...................... 82/1.11, 106, 159; 407/67, 113

[56] References Cited

U.S. PATENT DOCUMENTS

| | | | |
|---|---|---|---|
| 2,553,966 | 5/1951 | Groene | 82/106 |
| 3,701,187 | 10/1972 | Erkfritz | 407/113 |
| 4,018,112 | 4/1977 | Heaton et al. | 82/159 |
| 4,784,534 | 11/1988 | Kasminski et al. | 407/19 |
| 5,191,817 | 3/1993 | Mitsukuchi et al. | 82/1.11 |

FOREIGN PATENT DOCUMENTS 0211216  6/1986  European Pat. Off. .
3523274  6/1985  Fed. Rep. of Germany .
0008765  11/1988  World Int. Prop. O. ............ 82/106

Primary Examiner—Mark Rosenbaum
Assistant Examiner—John M. Husar
Attorney, Agent, or Firm—Robert W. Becker & Associates

[57] ABSTRACT

A method for machining surfaces of revolution at workpieces comprises the steps of: rotating the workpiece during machining; roughing the workpiece with a disk-shaped tool having at its circumferential edge cutting elements with cutting edges; and, for finishing the workpiece, plunge-cutting by turning the workpiece with the disk-shaped tool, wherein the step of plunge-cutting by turning is divided into a sequence of individual plunge-cutting by turning steps so that material of overlapping portions of the workpiece is removed sequentially. The tool comprises a disk-shaped base body with a circumferential edge and a first set and a second set of cutting elements that are connected to and distributed over the circumferential edge of the disk-shaped base body. The first set is used in the roughing process, and the second set is used in the finishing process by plunge-cutting by turning. The cutting elements of the second set are spaced at a distance from one another in the circumferential direction of the tool and axially staggered such that, when viewed in the circumferential direction, the working areas of the cutting elements overlap.

9 Claims, 3 Drawing Sheets ns or
REVOLUTION AT WORKPIECES AND
DISK-SHAPED TOOL FOR PERFORMING SAME

BACKGROUND OF THE INVENTION

The present invention relates to method for machining or turning surfaces of revolution at workpieces preferably at crankshafts, whereby the workpiece is rotated during machining, and wherein a disk-shaped tool that is provided with cutting elements at its circumferential edge for roughing of the workpiece and subsequent finishing of the workpiece is used. The tool for performing the method is provided with cutting elements for the roughing process and with cutting elements for the finishing process.

In the machining of crankshafts it is known from European Patent 0 211 216 and German Offenlegungschrift 35 23 274 to perform a roughing process of the crankshaft by radially plunge-cutting by turning with a formed cutter. Subsequent to this roughing process, the finishing process of the crankshaft is performed by turning broaching in which the crankshaft is rotated at a relatively high speed while the disk-shaped tool is rotated at a relatively low speed. For each individual width of a crankshaft pin, special cutters for the turning broaching of the finishing process must be employed since the cutting edges extend at an angle relative to the axis of rotation of the tool and furthermore must be embodied in a dished fashion. The cutting elements which must be special ordered are manufactured only in small quantities and are provided with only two cutting edges. Correspondingly, the cutting element costs for the broaching turning step of the finishing process are high. In order to produce cylindrical pins, the tool must further be provided with complicated plate seats for the cutting elements used for the broaching turning process. During broaching turning the cutting edges penetrate at a very great negative angle into the crankshaft resulting in very high normal forces. This results in an increased wear at the cutting edges of the cutting elements and in an increased bending of the crankshaft during the turning broaching process. As a consequence, during broaching turning processes a rattling tendency is observed which leads to a reduced accuracy of the cutting process. Furthermore, during the machining of steel in a turning broaching process long, curled cuttings are produced which inhibit a reliable flow of cuttings within the tool and the machine. Especially with automated machines the removal of these long, curled cuttings is difficult and expensive. These long, curled cuttings furthermore differ considerably with variations of the excess material to be removed.

It is therefore an object of the present invention to provide a method and a disk-shaped turning tool of the aforementioned kind in which as the cutting elements commercially available cutting plates that are made of various cutting materials may be employed and with which the workpiece may be machined during the finishing operation such that at low cutting material costs and with a reliable removal of cuttings a high precision cutting of the workpiece may be accomplished, while low cutting pressures will be generated.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
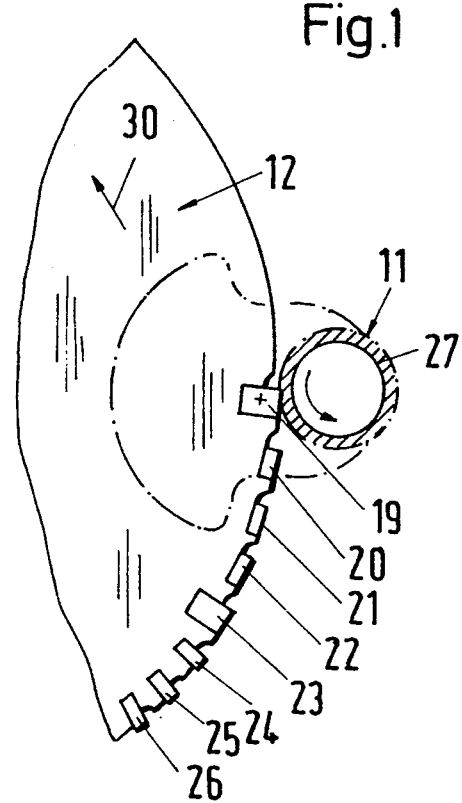
FIG. 1 is a side view of a portion of the inventive disk-shaped turning tool.

The method for machining surfaces of revolution at workpieces according to the present invention is primarily characterized by the steps of:

Rotating the workpiece during machining;

roughing the workpiece with a disk-shaped tool having at is circumferential edge cutting elements with cutting edges; and, for finishing the workpiece, plunge-cutting by turning the workpiece with the disk-shaped tool wherein the step of plunge-cutting by turning is divided into a sequence of individual plunge-cutting by turning steps so that material of overlapping portions of the workpiece is removed sequentially.

In the inventive method the finishing process is not carried out by a turning broaching step, but by a plunge-cutting by turning step in which the disk-shaped tool during the finishing operation is not rotated about its axis. For plunge-cutting by turning process commercially available, constructively simple turnplates may be employed which have a triangular or tetragonal shape with three or four cutting edges. Accordingly, when the inventive method is employed and the inventive tool is used for the inventive method the cutting material costs are very low. The constructively simple turn plates for the use as cutting elements require only simple plate seats at the tools so that the manufacture of the tool is simple and inexpensive. Due to the division of the plunge-cutting by turning step into individual plunge-cutting by turning steps an identical cutting width and thus also an identical width of the resulting cuttings for different end of the formation of the cuttings, does not occur, so that the plunge-cutting edges are not excessively worn. With the inventive method and the inventive tool crankshafts, drive shafts, and other workpiece surfaces that are rotational symmetrical may be machined.

In a preferred embodiment of the present invention, the sequence of the individual plunge-cutting by turning steps further comprises the steps of positioning the cutting element for the individual plunge-cutting by turning step with its cutting edge on an imaginary connecting line between the axis of rotation of the workpiece and the axis of rotation of the disk-shaped tool; and moving the cutting element into engagement with the workpiece. Preferably, the sequence further comprises the steps of: after completion of each individual plunge-cutting by turning step, radially removing the disk-shaped tool from engagement with the workpiece; and subsequently, rotating the disk-shaped tool about its axis of rotation until a further one of the cutting elements reaches the connecting line, followed by the step of moving the cutting element into engagement. It is also possible to simultaneously end of the formation of the cuttings, does not occur, so that the plunge-cutting edges are not excessively worn. With the inventive method and the inventive tool crankshafts, drive shafts, and other workpiece surfaces that are rotational symmetrical may be machined.

In a preferred embodiment of the present invention, the sequence of the individual plunge-cutting by turning steps further comprises the steps of positioning the cutting element for the individual plunge-cutting by turning step with its cutting edge on an imaginary connecting line between the axis of rotation of the workpiece and the axis of rotation of the disk-shaped tool; and moving the cutting element into engagement with the workpiece. Preferably, the sequence further comprises the steps of: after completion of each individual plunge-cutting by turning step, radially removing the disk-shaped tool from engagement with the workpiece; and subsequently, rotating the disk-shaped tool about its axis of rotation until a further one of the cutting elements reaches the connecting line, followed by the step of moving the cutting element into engagement. It is also possible to simultaneously radially remove and rotate the disk-shaped tool about its axis of rotation until a further one of the cutting elements reaches the connecting line.

The disk-shaped tool for performing the inventive method is comprised of a disk-shaped base body with a circumferential edge; and a first set and a second set of cutting elements, connected to and distributed over the circumferential edge, the first set for a roughing process and the second set for a finishing process by plunge-cutting by turning, with the cutting elements of the second set being spaced at a distance from one another in the circumferential direction of the tool and axially staggered such that, when viewed in the circumferential direction of the tool, the working areas of the cutting elements overlap. Preferably the cutting elements have cutting edges that extend parallel to the axis of rotation of the tool. Advantageously the cutting elements are turn plates. In a preferred embodiment, each cutting element has at least two cutting edges. Preferably, the tool comprises flat contact surfaces (plate seats) at the circumferential edge for receiving the cutting elements.

DESCRIPTION OF PREFERRED EMBODIMENTS

The present invention will now be described in detail with the aid of several specific embodiments utilizing FIGS. 1 through 8.

Figure 8:
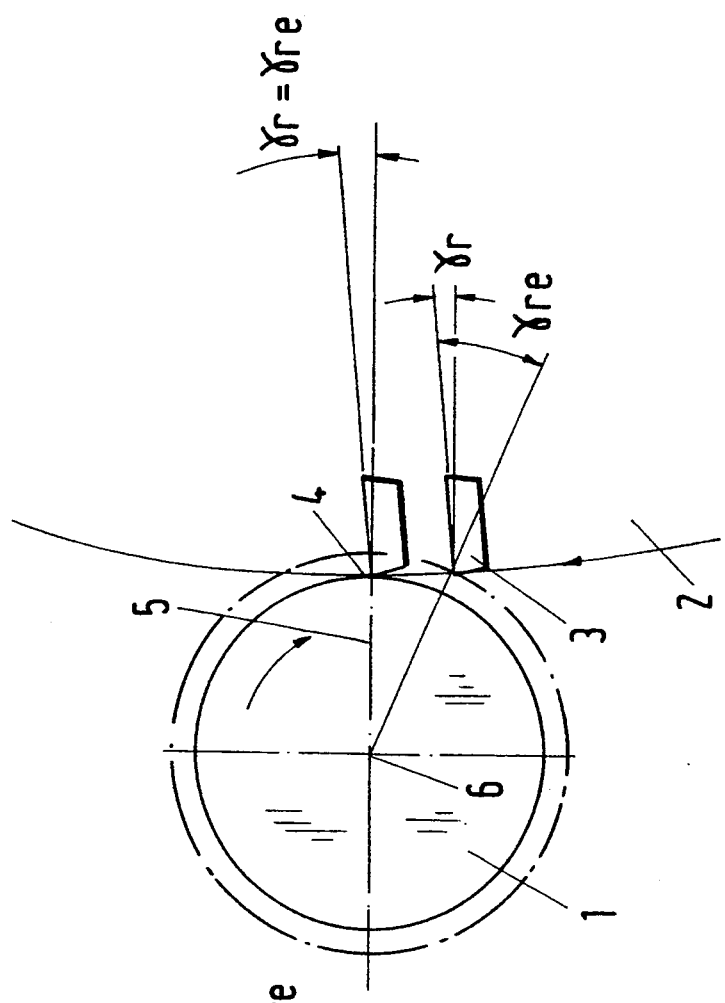
FIG. 8 is a representation corresponding to FIG. 7 showing the engagement between tool and a crankshaft pin during finishing according to the prior art.

During the machining of crankshafts it is known to machine the cylindrical surfaces (lift bearing and main bearing) during the roughing step by a turning process and during the finishing step by a turning broaching process. For this purpose, the crankshaft 1 is rotated at a high speed about the axis of the lift bearing or main bearing while the turning broaching tool 2 (FIG. 8) is rotated at a low speed in a counter clockwise or clockwise direction. The dash-dotted line in FIG. 8 represents the initial diameter of the crankshaft pin, which after completion of the turning broaching process, corresponds to the diameter indicated by a solid line. During the first engagement of the cutting edge 3 of the turning broaching tool with the crankshaft 1 the cutting angle $\gamma_r$ corresponds approximately to 5°, while the effective cutting angle $\gamma_{re}$ corresponds to approximately 30°. During the removal of excess material at the crankshaft 1 the effective cutting angle changes constantly until at the end of the turning broaching process it is identical to the cutting angle $\gamma_r$. At this point, the cutting edge 4 of the cutting element 3 is positioned on the connecting line 5 between the axis of rotation 6 of the crankshaft 1 and the non-represented axis of rotation of the tool 2. Since the effective cutting angle $\gamma_{re}$ constantly changes during the turning broaching process, optimal cutting conditions may not be achieved. At the beginning of the turning broaching process the cutting element 3 penetrates the crankshaft 1 at a negative angle, as represented in FIG. 8. Accordingly, a high nominal force is generated resulting in a very strong cutting edge wear at the cutting element 3. This wear in combination with the high normal force results in an increased bending of the crankshaft 1 during the turning broaching process. As a consequence a rattling tendency is observed during the turning broaching process which also leads to a loss in precision during machining.

Figure 7:
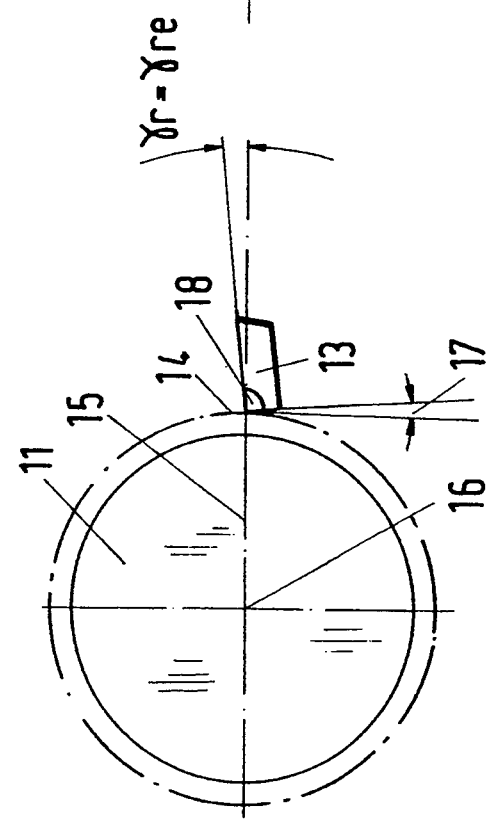
FIG. 7 demonstrates the engagement between tool and workpiece according to the inventive method for finishing the crankshaft pins.

These disadvantages may be prevented by performing the finishing operation of the crankshaft exclusively by a plunge-cutting by turning process. FIG. 7 shows schematically how the cutting element 13 of the turning tool with its cutting edge 14 penetrates the crankshaft 11 at the connecting line 15 between the axis of rotation 16 of the crankshaft 11 and the non-represented axis of rotation of the turning tool. Independent of the amount of excess material that already has been removed, the position of the cutting element 13 relative to the crankshaft 11 remains unchanged, i.e., the cutting angle $\gamma_r$ always corresponds to the effective cutting angle $\gamma_{re}$. Accordingly, during the entire finishing process, the same engagement between the cutting elements and the workpiece is present so that during the entire machining process the optimal cutting conditions are maintained. The front clearance angle 17 of the cutting element 13 may be very small so that the wedge angle 18 enclosing the cutting edge 14 may be correspondingly great. The cutting element 13 may thus be provided with an optimal cutting geometry. The front clearance angle 17 of the cutting element 3 of the turning broaching tool 2 is substantially greater so that the wedge angle of the cutting element in the area of the cutting edge is substantially smaller and the cutting element thus has a reduced stability.

Figure 2:
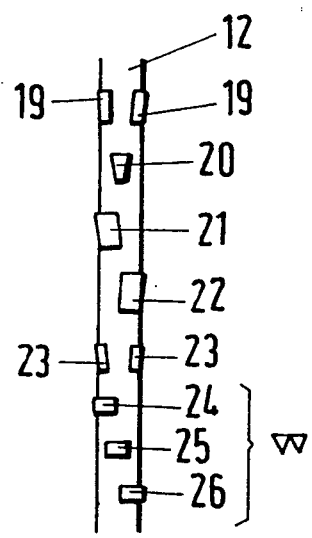
FIG. 2 is a developed projection of the cutting element arrangement of the turning tool according to FIG. 1.

FIGS. 1 and 2 show in an exemplary manner a portion of the turning tool 12. At the circumferential edge cutting elements 19 to 26 are provided one after another in the circumferential direction via which different machining steps may be performed at the crankshaft 11. The cutting elements 24 to 26 perform the finishing operation of the crankshaft pin 27. The cutting elements 19 to 26 form a cutting element array. At the circumferential edge of the turning tool 12 a plurality of such cutting element array are provided so that the turning tool 12 has a long service life.

Figure 3:
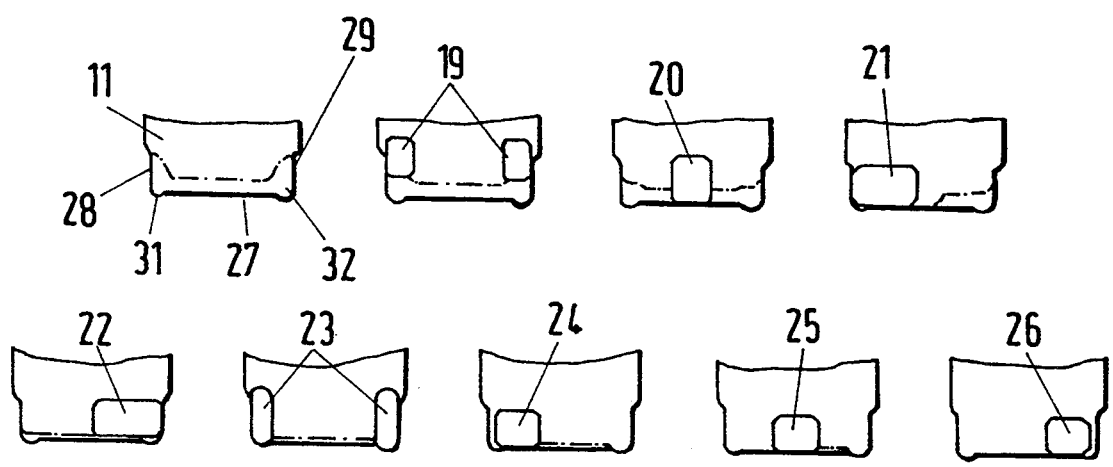
FIG. 3 is a schematic representation of the machining of a crankshaft pin by various cutting elements of the turning tool according to FIG. 1.

FIG. 3 shows in an exemplary manner how in a turning process the crankshaft 11 may be machined with the individual cutting elements 19 to 26. Only the circumferential surface of the pin 27 of a crankshaft 11 is schematically represented as are the adjacent collars 28 and 29. In the upper left representation of FIG. 3 the blank of a crankshaft pin 27 is represented in a dash-dotted line. The pin 27 is machined further with the plunge-cutting by turning process until the shape represented by a solid line in FIG. 3 has been reached. In a first step the collars 28, 29 of the crankshaft pin 27 are machined with the cutting elements 19 located at the sides of the disk-shaped turning tool 12 (FIG. 1). After completion of this first turning operation, the turning tool 12 is radially removed, rotated in the direction of the arrow 30 (FIG. 1), and is then radially displaced to engage the crankshaft 11. In the following step, the cutting element 20 roughs the center section of the crankshaft pin 27 with the turning tool 12 remaining stationary and the crankshaft 11 being rotated.

After the completion of this second turning operation the turning tool 12 is again radially removed from the crankshaft 11, rotated in the direction of the arrow 30, and moved back into engagement with the crankshaft 11. In this manner, the cutting elements 21 to 23 are subsequently brought into engagement with the crankshaft 11 (FIG. 3). With the cutting elements 21 and 22 the crankshaft pin 27 is roughed over its entire length until the final diameter has approximately been reached.

In a subsequent turning operation the cutting elements 23 are brought into engagement with the crankshaft 11. The cutting elements 23 are arranged opposite one another on either side of the disk-shaped turning tool 12 (FIG. 2). With the cutting elements 23 the collars 28 and 29 at the transition of the crankshaft pin 27 to the lateral webs are machined and, if necessary, the recesses 31 and 32 are also machined.

Figure 5:
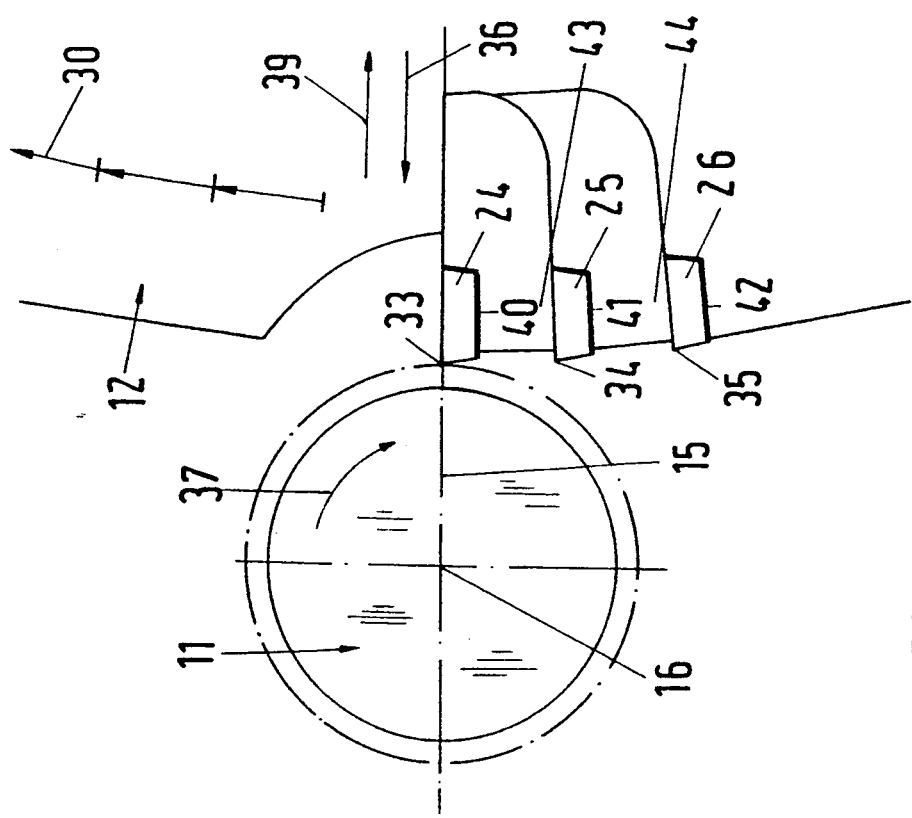
FIG. 5 is a schematic representation of the cutting elements of the inventive turning tool used for the of the crankshaft pin.
Figure 4:
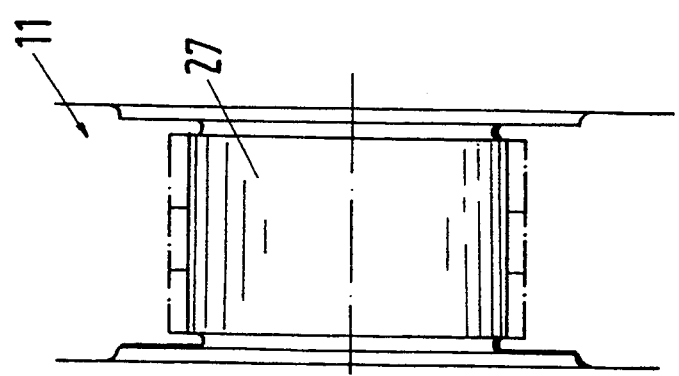
FIG. 4 is a side view of a crankshaft pin which is finished with the inventive turning tool.

After completion of the different turning steps with the cutting elements 19 to 23 the crankshaft pin 27 is approximately formed according to the desired final shape. The crankshaft pin 27 is subsequently finished with the cutting elements 24 to 26 in a finishing operation carried out by plunge-cutting by turning. The plunge-cutting elements 24 to 26 are brought into engagement with the crankshaft 11 one after another as represented in FIG. 3. The cutting elements 24 to 26 have cutting edges 33 to 35 (FIGS. 5 and 6) that extend parallel to the plane 15 defined between the axis of rotation 16 of the crankshaft 11 and the non-represented axis of rotation of the turning tool 12. The cutting edges 33 to 35 are one after another aligned in this plane 15. In a first step, the turning tool 12 with its cutting edges 24 to 26 is not engaged with the crankshaft 11. The turning tool 12 is then rotated in the aforedescribed manner in the direction of the arrow 30 until the first cutting element 24 with its cutting edge 33, viewed in the direction of rotation of the crankshaft 11, respectively, of the turning tool 12, is aligned with the plane 15 (FIG. 5). Then, the turning tool 12 is brought into engagement with the crankshaft 11 in the direction of the arrow 36 (FIG. 5). The crankshaft 11 is rotated in the direction of rotation 37 during the finishing operation, while the turning tool 12 remains stationary during the finishing operation. The cutting element 24 is maintained in engagement with the crankshaft 11 parallel to the plane 15 until the desired amount of excess material has been removed from the crankshaft pin 27 and the pin 27 has been provided with the desired radius, respectively, circumference that is indicated as a solid line in FIG. 5.

Figure 6:
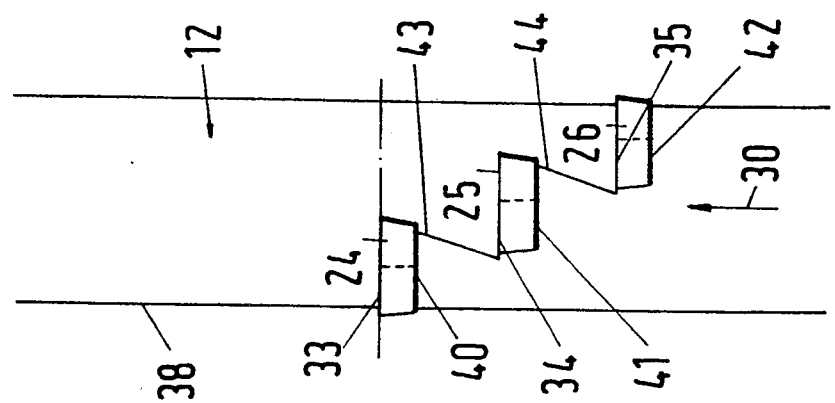
FIG. 6 is a developed projection of the turning tool with the cutting elements used for the finishing operation.

The width of the cutting element 24 corresponds only to a portion of the length of the crankshaft pin 27. In the represented embodiment, the cutting element 24 is arranged at the circumferential edge of the turning tool 12 such that it extends from one of the sides 38 of the turning tool 12 toward the center plane (FIG. 6).

The subsequently arranged cutting element 25 is spaced at a distance from the cutting element 24, when viewed in the circumferential direction of the turning tool, and is preferably identical to the cutting element 24. Viewed in the circumferential direction of the turning tool the cutting element 25 overlaps the cutting element 24. In the same manner the cutting element 26 is arranged at a distance from the cutting element 25 in the circumferential direction and also overlaps the cutting element 25.

As soon as the desired radius of the crankshaft pin 27 has been machined with the cutting element 24, the turning tool 12 is removed in the radial direction, indicated by arrow 39 in FIG. 5, until the cutting element is disengaged from the crankshaft 11. Subsequently, or simultaneously during removal, the turning tool 12 is rotated in the direction of arrow 30 to such an extent that the following cutting tool 25 with its cutting edge 34 is positioned in the plane 15. The turning tool 12 is then brought into engagement with the crankshaft 11 by being moved in the direction of arrow 36 whereby the cutting edge 34 remains in the plane 15 (FIG. 5). The cutting element 25 is maintained in engagement with the crankshaft pin 27 until the desired radius has been produced. With the cutting element 25 a center section of the mantle surface of the crankshaft pin 27 is machined.

As soon as the finishing operation with the cutting element 25 is complete, the turning tool 12 is rotated in the aforementioned manner so that now the cutting element 26 can machine the remaining portion of the mantle surface of the crankshaft pin 27 in the finishing operation.

Depending on the thickness of the turning tool 12, various numbers of cutting elements may be arranged in the circumferential direction, spaced at a distance and staggered relative to one another. The individual cutting elements may be arranged at a very short distance in the circumferential direction of the turning tool so that very short switching times are required in order to bring these cutting elements into sequential engagement with the crankshaft 11. Accordingly, the crankshaft may be machined by roughing as well as finishing in a very short period of time. Since the turning tool 12 during the entire machining of the crankshaft 11, especially during the finishing operation, is not rotated about its axis, and since the cutting elements 24 to 26 with their cutting edges 33 to 35 are parallel to the axis of rotation of the turning tool 12, and the cutting edges 33 to 35 are positioned in the plane 15 during the finishing operation, viewed in the rotational direction of the crankshaft 11, the cutting geometry remains the same during the entire machining process. Accordingly, a constant precision cutting with high accuracy of the crankshaft 11 is possible. Due to the stepwise finishing operation a small cutting pressure results which can be compensated by the crankshaft 11 to be finished without undue bending. Consequently, the commonly occurring after grinding of the cutting element at the workpiece, observed during turning broaching operations subsequent to the removal of the excess material, is not observed. This after grinding is a direct consequence of the increased normal force generated during turning broaching at the end of the removal process. This high normal force also accounts for a great elastic system loading which must be compensated before the workpiece and the tool may be disengaged. These problems do not occur during the divided plunge-cutting by turning process so that very high rotational speeds of the crankshaft may be achieved. Even for different amounts of excess material to be removed a constant cutting pressure is maintained. Due to the aforedescribed stepped arrangement of the cutting elements 24 to 26, an identical cutting width and thus an identical width of the resulting cuttings is achieved even for different amounts of excess material to removed. Due to the plunge-cutting by turning process only short curled cuttings are produced. Accordingly, the removal of the curled cuttings does not present any difficulties, and the turning tool 12 and the inventive method may also be employed with automated machines.

Since the cutting edges 33 to 35 are parallel to the axis of rotation of the tool 12 a simple adjustment of the cutting edges is possible. As can be taken from FIGS. 5 and 6 the turning tool 12 is provided with flat contact surfaces 40 to 42 for attaching thereto the cutting elements 24 to 26. The contact surfaces 40 to 42 are spaced at a distance one after the other in the circumferential direction of the turning tool 12 and are axially staggered relative to one another. The cutting elements 24 to 26 are connected to these contact surfaces. The contact surfaces 40 to 42 are connected to one another by slanted surfaces 43 and 44 (FIGS. 5 and 6) which in the direction of the axis of rotation of the turning tool 12 extend past the cutting elements 24 to 26 (FIG. 5). Conventional ISO turnplates may be used as cutting elements which are commercially available made from various materials. The cutting elements may be made of hard metals, ceramic materials, Cermet or similar material. The turnplates have a triangular or tetragonal configuration and thus three or four cutting edges which may all be used. Accordingly, very low cutting material costs arise. Due to the simple embodiment of the cutting elements 24 to 26, the respective contact surfaces 40 to 42 at the turning tool 12 are also of a simple embodiment. Since the cutting elements 24 to 26 are arranged at the turning tool 12 such that the cutting edges 33 to 35 are parallel to the axis of rotation of the turning tool, they do not require any special design and may be provided as straight edges.

The present invention is, of course, in no way restricted to the specific disclosure of the specification and drawings, but also encompasses any modifications within the scope of the appended claims.

What I claim is:

1. A method for machining surfaces of revolution at workpieces, comprising the steps of:
   rotating the workpiece during machining;
   roughing by turning the workpiece with a disk-shaped tool having at its circumferential edge cutting elements with cutting edges; and,
   for finishing the surfaces of revolution of the workpiece, plunge-cutting by turning the workpiece with the disk-shaped tool wherein said step of plunge-cutting by turning is divided into a sequence of individual plunge-cutting by turning steps so that in an axial direction of the surfaces of revolution material of overlapping portions of the workpiece is removed sequentially.

2. A method according to claim 1, wherein said sequence of individual plunge-cutting by turning steps further comprises the steps of:
   positioning the cutting element for the individual plunge-cutting by turning step with its cutting edge on an imaginary connecting line between the axis of rotation of the workpiece and the axis of rotation of the disk-shaped tool; and
   radially moving the cutting element into engagement with the workpiece.

3. A method according to claim 2, wherein said sequence of individual plunge-cutting by turning steps further comprises the steps of:
   after completion of each said individual plunge-cutting by turning step, radially removing the disk-shaped tool from engagement with the workpiece; and
   subsequently, rotating the disk-shaped tool about its axis of rotation until a further one the cutting elements reaches said connecting line, followed by said step of radially moving the cutting element into engagement.

4. A method according to claim 2, wherein said sequence of individual plunge-cutting by turning steps further comprises the steps of:
   after completion of each said individual plunge-cutting by turning step, radially removing the disk-shaped tool from engagement with the workpiece; and
   simultaneously, rotating the disk-shaped tool about its axis of rotation until a further one the cutting elements reaches said connecting line, followed by said step of radially moving the cutting element into engagement.

5. A disk-shaped tool for machining surfaces of revolution at workpieces, wherein the workpiece is rotated during machining, is roughed by turning with a disk-shaped tool having at its circumferential edge cutting elements with cutting edges, and, for finishing the workpiece, is plunge-cut by turning with the disk-shaped tool, and wherein plunge-cutting by turning comprises a sequence of individual plunge-cutting by turing steps so that in an axial direction of the surfaces of revolution material of overlapping portions of the workpiece is removed sequentially, said tool comprising:
   a disk-shaped base body with a circumferential edge; and
   a first set and a second set of cutting elements, connected to and distributed over said circumferential edge, said first set for a roughing process and said second set for a finishing process by plunge-cutting by turning, with said cutting elements of said second set being spaced at a distance from one another in the circumferential direction of said tool and axially staggered such that, when viewed in the circumferential direction of said tool, the working areas of said cutting elements overlap.

6. A tool according to claim 5, wherein said cutting elements have cutting edges extending parallel to the axis of rotation of said tool.

7. A tool according to claim 5, wherein aid cutting elements are turnplates.

8. A tool according to claim 5, wherein each said cutting element has at least two cutting edges.

9. A tool according o claim 5, further comprising flat contact surfaces at said circumferential edge for receiving said cutting elements.

* * * * *